Patented Jan. 6, 1953

2,624,693

UNITED STATES PATENT OFFICE 2,624,693

WAX PRODUCT AND PROCESS OF PREPARING SAME

Seymour W. Ferris, Mount Holly, N. J., assignor to Sun Oil Company, Philadelphia, Pa., a corporation of New Jersey No Drawing. Application November 25, 1950, Serial No. 197,634

5 Claims. (Cl. 196—17)

This invention relates to a microcrystalline wax product. More particularly the invention relates to a microcrystalline petroleum hydrocarbon wax product having novel properties including extreme flexibility, and to a process of preparing the same.

Microcrystalline waxes heretofore prepared have been employed for a variety of uses, such as for the water-proofing and laminating of paper and cloth, as a component of polishes, and the like. These waxes are prepared from relatively high boiling petroleum fractions by cold settling or centrifuging and usually have a melting point within the range of from 140° F. to 190° F., and a viscosity at 210° F. (Saybolt) of from 78 to 84. Although some microcrystalline waxes have been described as flexible, such waxes are not sufficiently flexible to permit their use in applications where flexibility at low temperatures is essential. For example, in the packaging of foods which are frozen and stored at low temperatures, waxes heretofore known must be compounded with foreign materials such as beeswax, rubber, resins, and the like, to yield a composition sufficiently flexible for use at such low temperatures.

An object of the present invention is to provide a petroleum hydrocarbon microcrystalline wax which is flexible and adherent to paper and other fibrous materials at low temperature and which possesses other novel properties. A further object is to provide a process for the preparation of a highly flexible microcrystalline wax. Other objects appear hereinafter.

It has been discovered that a novel microcrystalline wax characterized by extreme flexibility and other novel properties, as hereinafter described, may be prepared from petroleum slack wax.

The microcrystalline wax of the present invention has a melting point of from 105° F. to 120° F., a viscosity of from about 85 to 93 (Saybolt Universal at 210° F.), a penetration at 77° F. of about 40 to 50 (ASTM method D-5-25), an oil content of from 2% to 4.5% and is remarkably flexible at low temperatures. As demonstrated hereinafter, the flexibility of the present wax is over 100 times that of heretofore known waxes.

The term "flexible," and terms of similar import as employed herein, is used to describe the ability of strips of the wax in question to withstand repeated bending through a 180° cycle as fully described below in Example 2.

The wax of the present invention is prepared from petroleum, and it is essential, in order to obtain the desired wax, that certain critical variables be observed, as hereinafter described. To illustrate the present process, a slack wax obtained as a by-product from the de-waxing of lubricating oils, and which usually contains about 30% oil, is subjected to vacuum distillation to remove components boiling below 550° F. at 10 mm. Hg. The residuum is dissolved in a solvent, preferably a mixture of methyl ethyl ketone and benzene in about equal volumes, at a temperature sufficient to dissolve the wax, usually about 175° F. The solution is slowly cooled from the temperature of dissolution to from 58° F. to 62° F., and the precipitated wax separated, such as by filtering or centrifuging. The resulting filtrate is further cooled to a temperature of from 36° F. to 43° F., and the precipitated wax filtered. This latter filtered wax, after further treatment, forms the wax of the present invention. It is preferred to wash the separated wax either by washing the filter cake or by repulping and subsequent filtration, using as the washing material the solvent employed in the dissolution of the wax. Also, the washing operation is preferably conducted at the temperature of the final precipitation, namely, from 36° F. to 43° F.

After washing, the solvent is removed from the wax preferably by steam stripping or by distillation. Where desirable, the wax product may be decolorized such as by treating the wax in molten condition with a decolorizing clay.

In the distillation step, it is essential that enough of the low boiling constituents of the slack wax be removed so that the viscosity at 210° F. of the finished wax be at least 85 SUS, i. e. the components of slack wax boiling below 550° F. at 10 mm. Hg must be removed or the resulting wax product will not have the desired flexibility.

As above stated, the preferred solvent for dissolution of the wax residuum from the vacuum distillation is a mixture of about equal parts by volume of methyl ethyl ketone and benzene, volume ratios of from 4:1 to 1:4, and preferably from 4:6 to 6:4, being suitable. This solvent has a preferential solvent power for the oil of the wax residuum, and hence is effective to remove a substantial proportion thereof. Either of the components of the solvent may be replaced, in whole or in part, by other ketones, such as methyl butyl ketone, or acetone, or hydrocarbons or halogenated hydrocarbons such as ethylene dichloride, pentane, and hexane, or alcohols such as propyl or the heptyl alcohols.

After dissolution of the wax, the solution is cooled to about 60° F. and the precipitated wax removed. Before further treatment the ratio of solvent to wax in the filtrate should be from 8 to 11 parts of solvent per part of wax, and if below this ratio additional solvent should be added. A higher ratio may be employed but if used should be related to the quantity of wash liquor, as described below. The filtrate is further cooled to about 40° F., and the wax thereby precipitated is recovered preferably by filtration. The wax cake is then washed with the solvent above-described. From about 2 to 4 parts of wash liquor per part of wax is suitable, and the operation should be performed at substantially the same temperature as that of the last mentioned precipitation. As above mentioned, the quantity of wash liquor to employ is related to the ratio of solvent to wax in the solution from which the present wax is precipitated. When the ratio of solvent to wax in the solution is high, a relatively small quantity of wash liquor is employed, and where the ratio in the solution is low, a relatively large amount of wash liquor should be employed. The combination of these two factors determines the oil content of the final wax product, which must be within the range of 2% to 4.5%, and any combination of these factors giving this result may be employed. From a practical standpoint, the ratio of solvent to wax employed is largely determined by ease of filtration, and by adjusting the quantity of wash liquor accordingly. The temperatures stated are used in conjunction with the preferred solvent, as above described. Other solvents may exhibit a different solvency for the wax, i. e. the components of the wax precipitate from different solvents at different temperatures. Accordingly, the present wax product is obtained only when the same components are precipitated as when using the present preferred solvent at the defined temperatures. For example, using a solvent composed of materials other than methyl ethyl ketone and benzene may require that one or both, usually both, of the temperatures of precipitation be considerably lower than herein defined. In light of the present teachings, optimum temperatures for use with other solvents may be readily determined.

The yield of the present wax varies with the origin of the charge stock. Where the stock is slack wax from the de-waxing of lubricating oil, the yield is usually about 20%. In this instance it is preferred to employ about 9 or 10 parts of solvent per part of residuum, since this ratio gives, in each precipitation, a slurry of consistency that is readily filterable. Filtration is advantageously accomplished with a rotary type continuous filter having a provision for washing the wax cake. In the washing operation, preferably from 2 to 3 parts of wash liquor, which is the present preferred solvent, per part of charge is used, and also preferably the washing operation is performed at the temperature of the final precipitation.

The following examples illustrate the preparation of the present wax product:

*Example 1*

In order to demonstrate the process for the preparation of the present wax, a slack wax containing about 30% oil obtained from the de-waxing of lubricating oil was distilled to remove the components boiling below about 550° F. at 10 mm. Hg. The residuum was dissolved at a temperature of about 175° F. in five parts of solvent per part of residuum, the solvent consisting of substantially equal parts by volume of methyl ethyl ketone and benzene. The solution was cooled to 58° F. and the precipitated wax filtered. Solvent was stripped from the filtrate and the resulting wax was dissolved in the solvent at a temperature of 133° F., 10.1 parts of solvent per part of wax being employed. Solvent stripping at this point is unnecessary where the quantity of wax remaining in the filtrate is known, such procedure being here employed in order to more fully teach the present process. Where the solvent is not stripped, additional solvent is added, preferably with heating to bring the ratio of solvent wax within the stated ratio.

The solution was cooled to 42° F., the precipitated wax filtered on a rotary drum filter and washed with 2.5 parts of solvent per part of wax. Solvent remaining with wax was removed by steam stripping and there was obtained a 14.3 weight percent yield of wax based on the charge.

The wax was then decolorized by heating to 350° F. with clay for 3.5 hours, using 60 pounds of clay per barrel of wax.

The finished wax had a melting point of 110° F., an oil content of 4.4%, a penetration of 77, a viscosity (SUS at 210° F.) of 87, a color (NPA) of 4¼ and a flexibility of more than 200.

The above process was substantially repeated, except that the initial precipitation was made at 62° F. and the final precipitation at 41° F. The decolorized product had a melting point of 116° F., an oil content of 3.4%, a penetration of 52, a viscosity (SUS at 210° F.) of 88.5, a color (NPA) of 4½, and a flexibility of more than 200.

*Example 2*

This example illustrates the unobvious properties of the present wax by comparison of its flexibility with the most comparable waxes heretofore prepared. The test was performed as follows:

The wax is cut into strips ½ inch wide and 1/16 inch thick after forming in sheets by cooling on a water surface. The strips are wrapped in a glassine paper and conditioned at the test temperature (—10° F. in the test reported here) for at least 24 hours. The paper is removed and the strips adjusted in an apparatus which flexes it 90° in one direction; brings it back through the original position and flexes it 90° in the opposite direction; brings it back through the original position and so on unitl a complete break results. A flex cycle is considered as a 90° bend plus the return to the original position. The speed of flexing need not be closely controlled, a speed of from one to two cycles per second being appropriate and giving accurate results. Extreme rates of flexing, either fast or slow, may not give accurate results and hence should be avoided. The average of three tests is reported.

Results obtained were as follow:

|  | Number of flex cycles required to break at —10° F. |
|---|---|
| Wax A | ¼ |
| Wax B | ¼ |
| Wax C | ¼ |
| Wax D | ½–¼ |
| Wax E | ½ |
| Present wax | 155 |

Other properties of the above waxes, presented to show their similarity, are as follow:

|  | Wax A | Wax B | Wax C | Wax D | Wax E | Present Wax |
|---|---|---|---|---|---|---|
| Melting point, °F., ASTM D127–30 | 159 | 170 | 159 | 166 | 160 | 115 |
| Viscosity at 210° F. SUS, ASTM D446–39 | 71 | 78 | 71 | 122 | 74 | 88 |
| Penetration at 77° F., ASTM D5–25 | 25 | 27 | 25 | 23 | 24 | 40 |
| Color NPA, ASTM D155–45T | 4½ | 4 | 4½ | 3½ | 4½ | 4¼ |

*Example 3*

The novel properties of the present wax are further emphasized by comparable data showing cohesion of wax to paper at low temperatures. The waxes tested were the same as in Example 2. The tests were performed as follows:

Fifty pound standard kraft paper is dip-coated with the wax so that at least 1/64 inch is applied to each side of a strip 1 inch wide. Six coated strips are fastened securely about ¼ turn around a ½ inch dowel and a 200 gram weight is hung on the other end of each strip. The assembly is then placed in a constant temperature room at the test temperature for two hours. At the end of this period the dowel is revolved one complete turn. Flaking (separation of the wax layer from the paper) on more than one strip is considered a failure.

The tests were performed at three temperatures, with results as follow:

|  | Temperature | | |
|---|---|---|---|
|  | −10° F. | −20° F. | −30° F. |
| Wax A | pass | fail |  |
| Wax B | do | do |  |
| Wax C | do | pass | fail |
| Wax D | do | fail |  |
| Wax E | do | pass | fail |
| Present wax | do | do | pass |

*Example 4*

In order to demonstrate the importance of the distillation step, as above described, a wax containing about 15% of material distillable at 550° F. and 10 mm. Hg but otherwise identical to the present wax, was prepared. The flexibility of the new wax was less than 1 cycle as determined by the procedure of Example 2. On removal of the low boiling material by distillation, a wax was obtained having good flexibility (over 100 cycles).

Examples 2 and 3 demonstrate the ability of the present wax product to withstand rough handling, and to allow a paper coated therewith to be even tightly creased without cracking the wax layer. A further novel feature of the present microcrystalline wax, its low melting point, permits materials such as meats to be coated at lower temperatures than those required with microcrystalline waxes heretofore known. Other applications and advantages of the present wax will be apparent to those skilled in the art.

It has been discovered, as demonstrated in the above examples, that a microcrystalline wax can be derived from petroleum which, while it has many properties similar to heretofore known waxes, is remarkably outstanding in flexibility. The reason for this property is not known, nor has it been possible to correlate flexibility with other physical properties or with the composition. It is known that even a slight deviation from the described ranges for variables in the preparation of the wax produces a product of low flexibility. For example, oil content and viscosity are important and must be within the stated ranges or the wax is not flexible. It is possible to state, however, that the viscosity of the wax must be above 85 SUS, and preferably is from 88 to 93 SUS, and that in the viscosity range of from 85 to 88.5 SUS the oil content must be in the range of from 3% to 4.5%, whereas at higher viscosities, say from 90 to 93 SUS, a lower oil content is permissible, and can be from 2% to 4.5%.

The invention claimed is:

1. A microcrystalline petroleum wax which melts within the range of from 105° F. to 120° F., has a flexibility of over 100 cycles at −10° F. as measured by flexing a strip thereof ½ inch wide and 1/16 inch thick 90° in one direction, back to the original position, and then 90° in the other direction, a cycle being a 90° bend and return to the original position, and has an oil content of from 2% to 4.5%.

2. A microcrystalline petroleum wax which melts within the range of from 105° F. and 120° F., has a viscosity of from 85 to 93 SUS at 210° F., an oil content of from 2% to 4.5%, and which has a flexibility of over 100 cycles at −10° F. as measured by flexing a strip thereof ½ inch wide and 1/16 inch thick 90° in one direction, back to the original position, and then 90° in the other direction, a cycle being a 90° bend and return to the original position.

3. Process for the preparation of a microcrystalline petroleum wax which melts within the range of from 105° F. to 120° F. and possesses the property of extreme flexibility which comprises distilling slack wax under vacuum to remove components boiling below 550° F. at 10 mm. Hg, dissolving the residuum in a solvent at an elevated temperature, cooling said solution to a temperature of from 58° F. to 62° F. whereby a portion of the dissolved wax is precipitated, separating precipitated wax, cooling the remaining solution to a temperature of from 36° F. to 43° F. whereby an additional portion of the dissolved wax is precipitated, separating the precipitated wax, washing the last named separated wax with solvent, and removing solvent from the separated wax.

4. Process for the preparation of a microcrystalline petroleum wax which melts within the range of from 105° F. to 120° F., has a viscosity of from 85 to 93 SUS, an oil content of from 2% to 4.5%, and which has a flexibility of over 100 cycles at −10° F. as measured by flexing a strip thereof ½ inch wide and 1/16 inch thick 90° in one direction, back to the original position, and then 90° in the other direction, a cycle being a 90° bend and return to the original position, which comprises distilling slack wax under vacuum to remove components boiling below 550° F. at 10 mm. Hg, dissolving the residuum in a solvent consisting of approximately equal parts by volume of methyl ethyl ketone and benzene at an elevated temperature, cooling said solution to a temperature of from 58° F. to 62° F. whereby a portion of the dissolved wax is precipitated, separating precipitated wax, adjusting the ratio of solvent to wax in the remaining solution to from about 8 to 11 parts of solvent per part of wax, cooling the solution to a temperature of from 36° F. to 43° F., whereby an additional portion of the dissolved wax is precipitated, separating precipitated wax therefrom, washing the last named separated wax with from about 2 to 4 parts of said solvent per part of wax, and removing solvent from said wax.

5. A microcrystalline petroleum wax which melts within the range of from 105° F. and 120° F., has a viscosity of from 85 to 93 SUS at 210° F., an oil content of from 2% to 4.5%, a penetration at 77° F. of from 40 to 50, and which has a flexibility of over 100 cycles at −10° F. as measured by flexing a strip thereof ½ inch wide and $\tfrac{1}{16}$ inch thick 90° in one direction, back to the original position, and then 90° in the other direction, a cycle being at 90° bend and return to the original position.

SEYMOUR W. FERRIS.

REFERENCES CITED

The following references are of record in the file of this patent:

UNITED STATES PATENTS

| Number | Name | Date |
|---|---|---|
| 1,921,860 | Bahlke | Aug. 8, 1933 |
| 1,937,518 | Henderson et al. | Dec. 5, 1933 |
| 2,229,658 | Jenkins | Jan. 28, 1941 |
| 2,348,689 | Abrams et al. | May 9, 1944 |